(12) United States Patent
Mossoba et al.

(10) Patent No.: US 11,349,519 B2
(45) Date of Patent: May 31, 2022

(54) FAN-OUT PHONE CASE WALLET

(71) Applicant: Capital One Services, LLC, McLean, VA (US)

(72) Inventors: Michael Mossoba, Arlington, VA (US); Abdelkader M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/818,415

(22) Filed: Mar. 13, 2020

(65) Prior Publication Data

US 2020/0212950 A1    Jul. 2, 2020

Related U.S. Application Data

(63) Continuation of application No. 16/201,611, filed on Nov. 27, 2018, now Pat. No. 10,630,333.

(51) Int. Cl.
| | |
|---|---|
| *H04B 1/3888* | (2015.01) |
| *A45C 1/06* | (2006.01) |
| *A45C 11/18* | (2006.01) |
| *G06F 1/16* | (2006.01) |
| *H04M 1/04* | (2006.01) |
| *A45C 11/00* | (2006.01) |
| *A45C 1/08* | (2006.01) |

(52) U.S. Cl.
CPC .............. *H04B 1/3888* (2013.01); *A45C 1/06* (2013.01); *A45C 11/182* (2013.01); *G06F 1/1626* (2013.01); *H04M 1/04* (2013.01); *A45C 2001/065* (2013.01); *A45C 2001/083* (2013.01); *A45C 2011/002* (2013.01)

(58) Field of Classification Search
CPC ...... H04B 1/3888; H04B 1/3816; A45C 1/06; A45C 11/182; A45C 2011/002; A45C 2001/065; A45C 2001/083; G06F 1/1626; H04M 1/04; H04M 1/185; H04M 1/21
See application file for complete search history.

(56) References Cited

U.S. PATENT DOCUMENTS

2011/0095976 A1 *   4/2011   Hwang ................. G06F 1/1624
                                                 345/156
2013/0256489 A1   10/2013   Ergun et al.
(Continued)

*Primary Examiner* — Yuwen Pan
*Assistant Examiner* — Fatuma G Sherif
(74) *Attorney, Agent, or Firm* — DLA Piper LLP US

(57) ABSTRACT

A case may include a compartment configured to contain at least one card. The compartment may be open on a first side. Some embodiments may include an ejector disposed at least partially in the compartment and configured to eject the at least one card through the first side. In some embodiments, the ejector may include a slider configured to slide in a first direction from a second side of the compartment opposite the first side of the compartment towards the first side of the compartment. In some embodiments, the ejector may include an expander configured to expand in a first direction from a second side of the compartment opposite the first side of the compartment towards the first side of the compartment. Some embodiments of the case may include a spring wall configured to compress the at least one card within the compartment.

7 Claims, 13 Drawing Sheets

(56) References Cited

U.S. PATENT DOCUMENTS

| | | | |
|---|---|---|---|
| 2014/0251368 A1* | 9/2014 | Lawson | A45C 13/02 |
| | | | 132/287 |
| 2015/0335118 A1 | 11/2015 | Van Geer | |
| 2016/0353864 A1* | 12/2016 | Paduano | A45F 3/04 |
| 2017/0026498 A1 | 1/2017 | Goldfain et al. | |
| 2018/0140061 A1 | 5/2018 | Chan et al. | |
| 2018/0140066 A1* | 5/2018 | Talarico | A45C 11/182 |
| 2018/0310681 A1* | 11/2018 | Wingerter | A45C 11/182 |
| 2019/0387853 A1 | 12/2019 | Chan et al. | |

\* cited by examiner

FAN-OUT PHONE CASE WALLET

CROSS-REFERENCE TO RELATED APPLICATION INFORMATION

This application claims priority to U.S. patent application Ser. No. 16/201,611, filed Nov. 27, 2018, the entirety of which is incorporated herein by reference

BACKGROUND

Mobile devices such as phones and tablets are ubiquitous. Many users house their mobile devices inside cases. The cases may serve a protective and/or decorative function, housing the relatively fragile mobile devices within while still providing access to device functionality and/or interfaces such as touch screens and/or buttons. Some cases include additional features, such as storage for other items (e.g., credit cards, IDs, cash, and/or other items traditionally carried within wallets). Indeed, some cases can be considered combinations of phone cases and wallets.

SUMMARY OF THE DISCLOSURE

A case may include a first compartment configured to contain a smartphone. The case may include a second compartment configured to contain at least one card. The second compartment may be open on a first side. The case may include an ejector disposed at least partially in the second compartment and configured to eject the at least one card through the first side. The ejector may include a slider configured to slide in a first direction from a second side of the second compartment opposite the first side of the second compartment towards the first side of the second compartment. The ejector may include a slider actuator disposed on an outside of the case and configured to slide the slider.

In some embodiments, the slider may be tapered from a fourth side of the second compartment, substantially perpendicular to the first side of the second compartment, to a third side of the second compartment opposite the fourth side of the second compartment.

In some embodiments, the slider may include multiple stepped surfaces. Each stepped surface may include an edge facing the first side of the second compartment that is a different distance from the first side of the second compartment than the edges of each other stepped surface.

In some embodiments, the case may include a spring wall configured to compress the at least one card within the second compartment in a second direction substantially perpendicular to the first direction. In some embodiments, the case may include at least one spring coupling the spring wall to the case. In some embodiments, the case may include a plurality of springs coupling the spring wall to the case. The slider may be tapered from a third side of the second compartment, substantially perpendicular to the first side of the second compartment, to a fourth side of the second compartment opposite the third side of the second compartment. The plurality of springs may be arranged with a greater number of springs adjacent to the third side of the second compartment than a number of springs adjacent to the fourth side of the second compartment.

A case may include a first compartment configured to contain a smartphone. The case may include a second compartment configured to contain at least one card. The second compartment may be open on a first side. The case may include an ejector disposed at least partially in the second compartment and configured to eject the at least one card through the first side. The ejector may include an expander configured to expand in a first direction from a second side of the second compartment opposite the first side of the second compartment towards the first side of the second compartment. The ejector may include an expansion actuator disposed on an outside of the case and configured to expand the expander.

In some embodiments, the expander may include an axle disposed adjacent to a third side of the second compartment that is substantially perpendicular to the first side of the second compartment. The expander may include at least one arm, each arm including a first side rotatably coupled to the axle and a second side opposite the first side and configured to be moved in the first direction by the expansion actuator. In some embodiments, the at least one arm may include a plurality of arms stacked in a second direction substantially perpendicular to the first direction. In some embodiments, the expansion actuator may include a gear set at the axle configured to move each of the plurality of arms towards the first side of the second compartment at different rates.

In some embodiments, the case may include a spring wall configured to compress the at least one card within the second compartment in a second direction substantially perpendicular to the first direction. In some embodiments, the case may include at least one spring coupling the spring wall to the case. In some embodiments, the case may include a plurality of springs coupling the spring wall to the case. The expander may include an axle disposed adjacent to a third side of the second compartment that is substantially perpendicular to the first side of the second compartment. The expander may include a plurality of arms stacked in a second direction substantially perpendicular to the first direction. Each arm may include a first side rotatably coupled to the axle and a second side opposite the first side and configured to be moved in the first direction by the expansion actuator. The expansion actuator may include a gear set at the axle configured to move each of the plurality of arms towards the first side of the second compartment at different rates. The plurality of springs may be arranged with a greater number of springs adjacent to the third side of the second compartment than a number of springs adjacent to the fourth side of the second compartment.

A case may include a first compartment configured to contain a smartphone. The case may include a second compartment configured to contain at least one card. The second compartment may be open on a first side. The case may include an ejector disposed at least partially in the second compartment and configured to eject the at least one card through the first side. The case may include a spring wall configured to compress the at least one card within the second compartment in a second direction substantially perpendicular to the first direction.

In some embodiments, the ejector may include a slider configured to slide in a first direction from a second side of the second compartment opposite the first side of the second compartment towards the first side of the second compartment. The ejector may include a slider actuator disposed on an outside of the case and configured to slide the slider. In some embodiments, the slider may be tapered from a fourth side of the second compartment, substantially perpendicular to the first side of the second compartment, to a third side of the second compartment opposite the fourth side of the second compartment.

In some embodiments, the ejector may include an expander configured to expand in a first direction from a second side of the second compartment opposite the first side of the second compartment towards the first side of the second compartment. The ejector may include an expansion actuator disposed on an outside of the case and configured to expand the expander. In some embodiments, the expander may include an axle disposed adjacent to a third side of the second compartment that is substantially perpendicular to the first side of the second compartment. The expander may include a plurality of arms may include in a second direction substantially perpendicular to the first direction. Each arm including a first side rotatably coupled to the axle and a second side opposite the first side and configured to be moved in the first direction by the expansion actuator. The expansion actuator may include a gear set at the axle configured to move each of the plurality of arms towards the first side of the second compartment at different rates.

In some embodiments, the case may include at least one spring coupling the spring wall to the case.

In some embodiments, the case may include a plurality of springs coupling the spring wall to the case. The plurality of springs may be arranged with a greater number of springs adjacent to a third side of the second compartment, arranged perpendicular to the first side of the second compartment, than a number of springs adjacent to a fourth third side of the second compartment opposite the third side of the second compartment.

DETAILED DESCRIPTION OF SEVERAL EMBODIMENTS

Disclosed embodiments may include combination devices configured to house mobile devices and other items such as credit cards, debit cards, ID cards, etc. ("phone case wallets"). In some embodiments, phone case wallets may include features that make it easy for a user to inspect the contents thereof without fully removing the contents. For example, some phone case wallets may include "fan-out" functionality, which may display a plurality of cards in the wallet simultaneously and in a staggered arrangement so that a user may be able to inspect each card at the same time, remove one or more without removing the others, and securely replace the unremoved cards. Disclosed embodiments may include various mechanical features configured to provide the fan-out functionality.

Figure 1A:
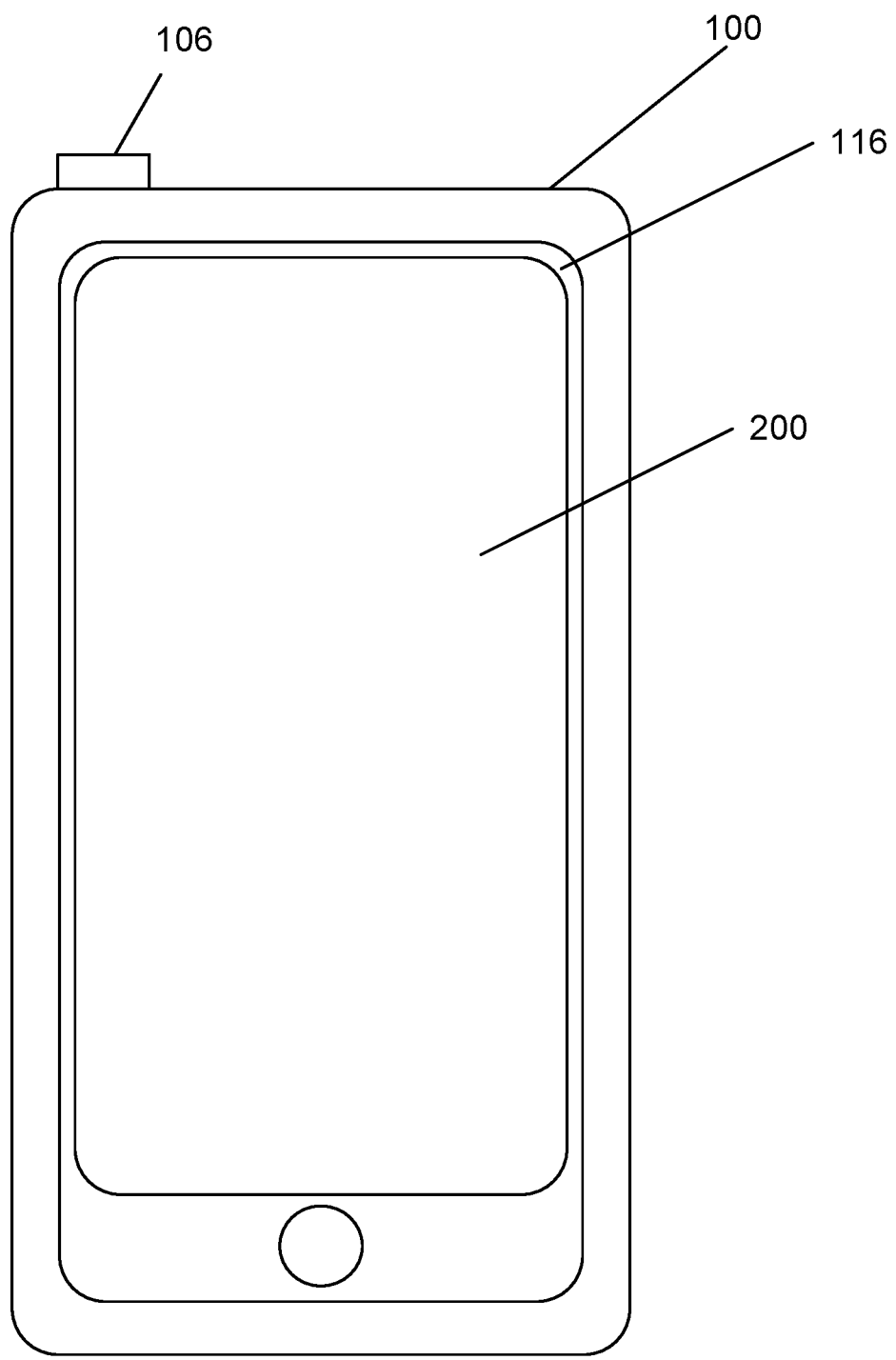
FIGS. 1A-1C show a fan-out phone case wallet according to an embodiment of the present disclosure.
Figure 1B:
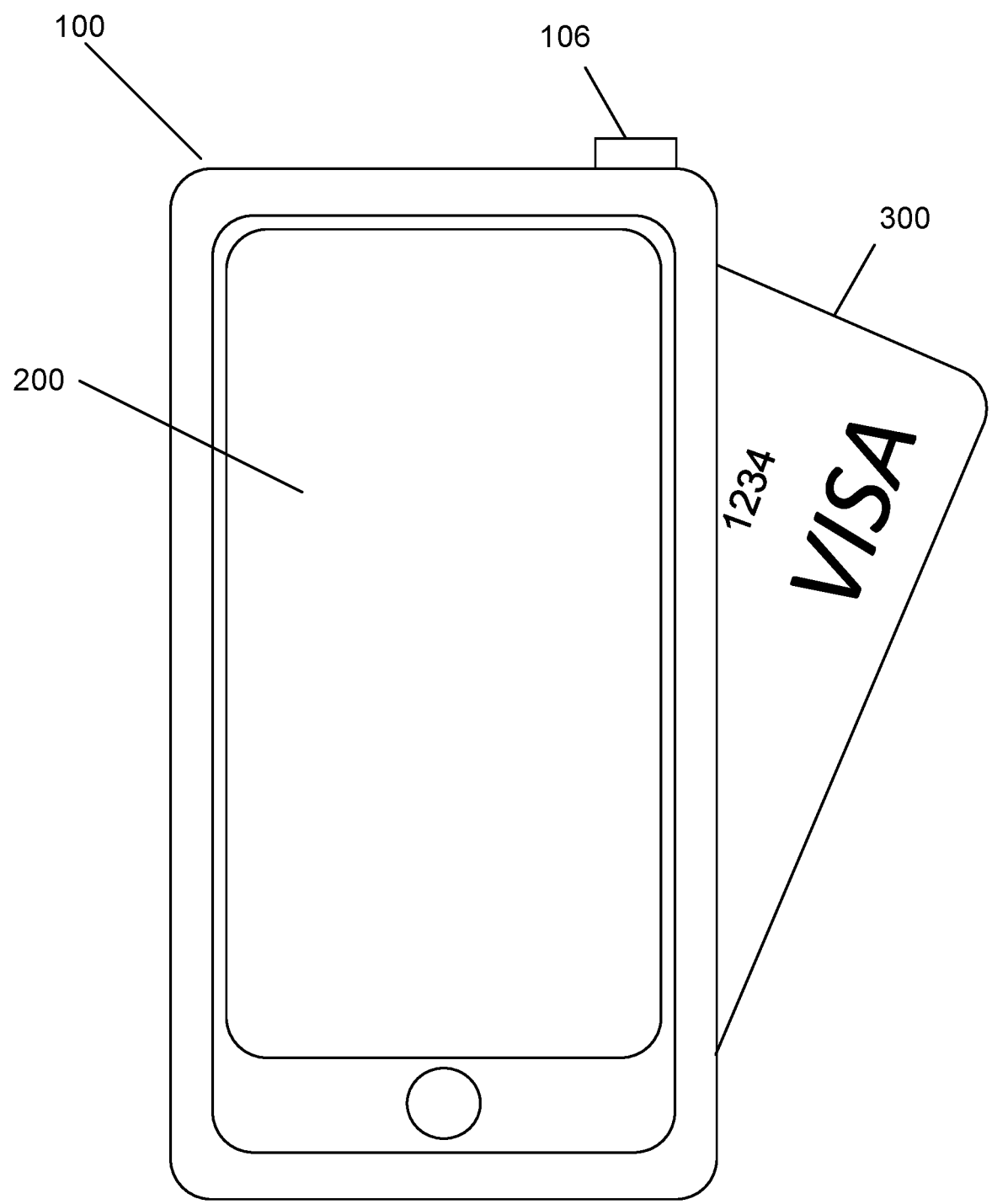
Figure 1C:
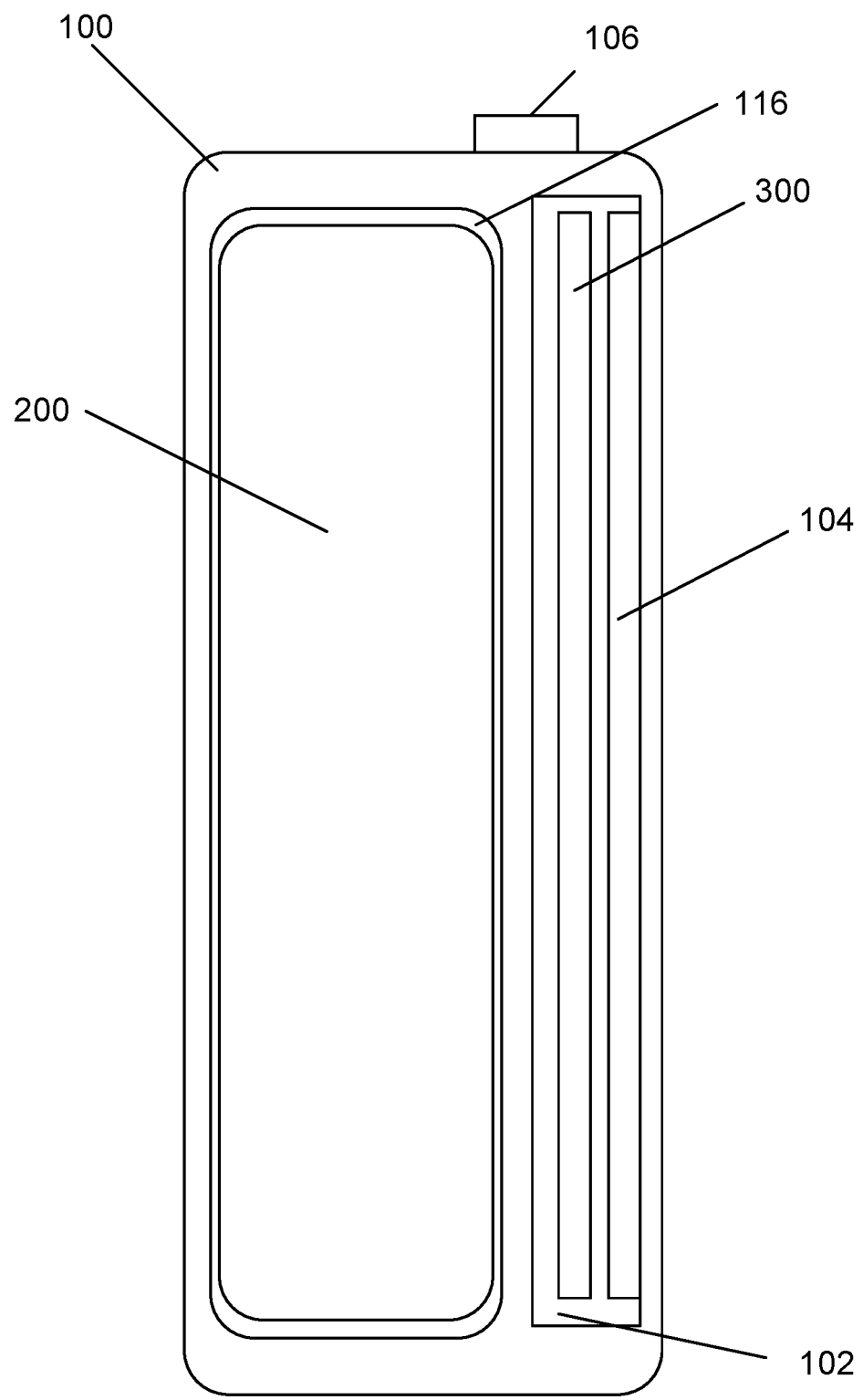

FIGS. 1A-1C show a fan-out phone case wallet 100 according to an embodiment of the present disclosure. Phone case wallet 100 may be made of any material or combination thereof, including metal, plastic, rubber, leather, etc. Phone case wallet 100 may include phone compartment 116 configured to house a mobile device 200 such as a smartphone, tablet, or other device. In some embodiments, phone compartment 116 may be sized to house a specific make and/or model of mobile device 200, and an overall size of phone case wallet 100 may vary to contain mobile device 200 with a minimum of size beyond the size of phone compartment 116. Phone case wallet 100 may also include card compartment 102 configured to hold one or more cards 300. Cards 300 may include credit cards, debit cards, ID cards, business cards, or any other cards. In some embodiments, card compartment 102 may be sized to house cards 300 of approximately the same size (e.g., the size of a standard credit card, or 85.60 mm*53.98 mm*0.76 mm). In some embodiments, card compartment 102 may be larger than cards 300 housed therein (e.g., larger than the size of the standard credit card) to allow cards 300 to tip and/or rotate at least partially within card compartment 102, as described in detail below.

Phone case wallet 100 may include an actuator 106 which may be mechanically coupled to an ejector. The ejector may be one of a variety of types, and specific examples of ejector types are described with respect to subsequent figures. In any case, actuator 106 may be movable in a first direction (e.g., by a user) from a first position (e.g., as shown in FIG. 1A) to a second position (e.g., as shown in FIG. 1B) and back. In some embodiments, actuator 106 may be configured to move gradually from the first position to the second position or vice versa, so that actuator 106 may be positioned in any intermediate position therebetween. As shown in FIG. 1B, movement of actuator 106 in the first direction may cause card(s) 300 to be partially ejected from card compartment 102 for inspection and/or retrieval by the user.

In some embodiments, card compartment 102 may house a card retention system such as a spring wall 104. Specific examples of spring wall 104 configuration and operation are described in greater detail below.

Figure 2A:
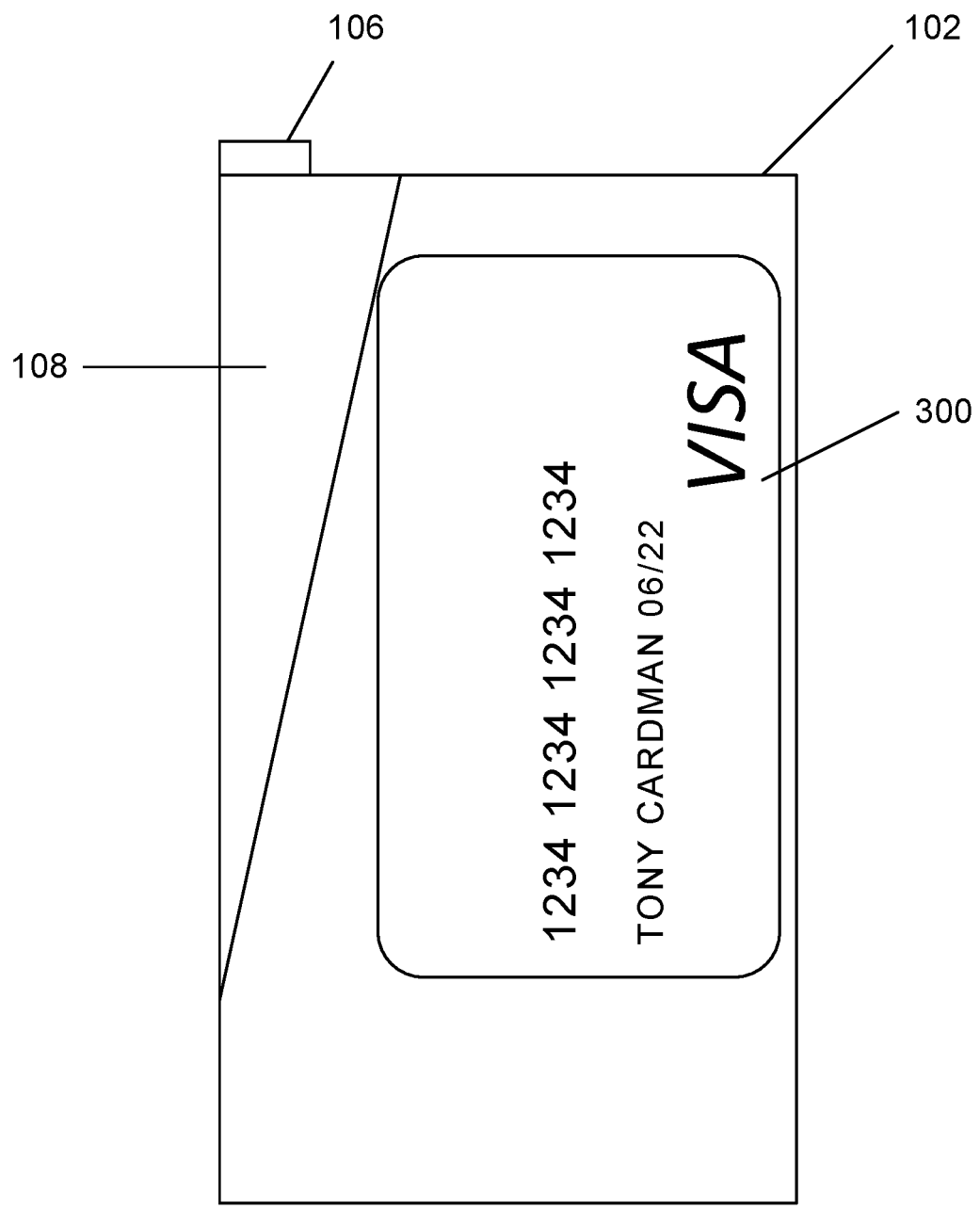
FIGS. 2A-2B show a slider according to an embodiment of the present disclosure.
Figure 2B:
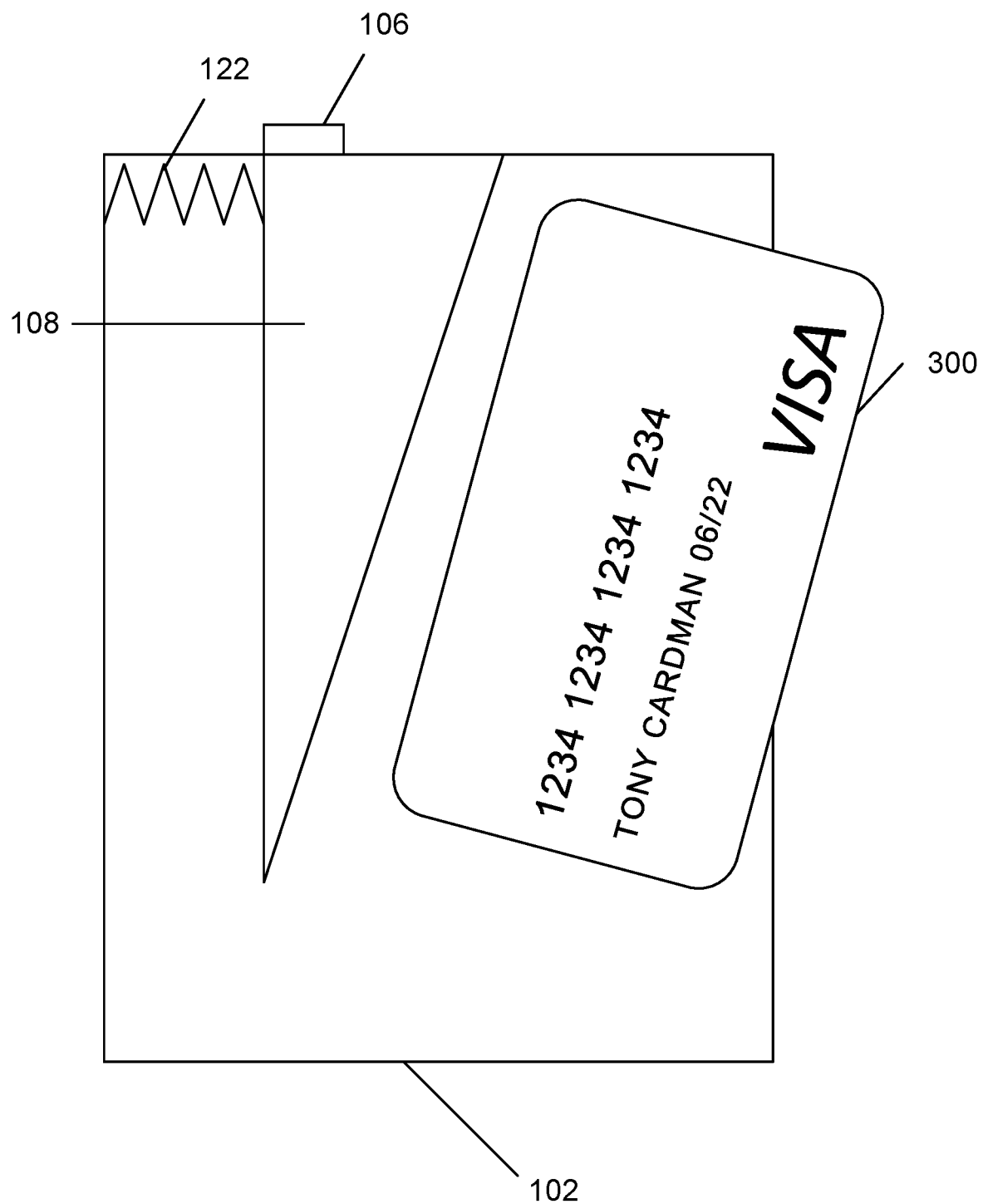

FIGS. 2A-2B show a slider 108 according to an embodiment of the present disclosure. As described above, phone case wallet 100 may include an actuator 106 which may be mechanically coupled to an ejector. In the embodiment of FIGS. 2A-2B, the ejector may include slider 108, and actuator 106 may be a slider actuator fixedly coupled to slider 108. In some embodiments, slider 108 and actuator 106 may be integrally formed as a single piece. In some embodiments, actuator 106 may be made from or covered by a rubber material or other material that may enhance the ability of a user to grip actuator 106. Slider 108 may be made from the same material or any other material (e.g., wood, metal, plastic, rubber, etc.). In some embodiments, slider 108 and actuator 106 may be joined by a narrow connector 118 that may be narrower than slider 108 and actuator 106, as shown in FIG. 2D.

As shown in FIGS. 2A-2B, as actuator 106 moves in the first direction, slider 108 may move as well. Accordingly, slider 108 may move from a first position (e.g., FIG. 2A) where card 300 is fully contained within card compartment 102 to a second position (e.g., FIG. 2B) where card 300 is at least partially ejected from card compartment 102. In some embodiments, slider 108 may move within track 120 which may be disposed in the top of phone case wallet 100, as shown in FIG. 2E. Track 120 may be narrower than slider 108 and actuator 106 but sized to accept connector 118, thereby allowing connector 118 to slide in track 120 while the wider slider 108 and actuator 106 are unable to pass through track 120. In some embodiments, one or more springs 122 or other tensioners may be attached to slider 108 and an inside of card compartment 102 (e.g., as shown in FIG. 2B), for example to provide tension when a user slides actuator 106 and/or to cause slider 108 to automatically spring back to the first position when a user releases actuator 106.

In some embodiments, slider 108 may be tapered from one side of card compartment 102 an opposite another side of card compartment 102. In the example of FIG. 2A-2B, slider 108 is tapered from a wide portion coupled to actuator 106 to a narrow portion opposite actuator 106. In other embodiments, slider 108 may be tapered in an opposite fashion (e.g., with the narrow portion coupled to actuator 106). Due to the taper, slider 108 may rotate card 300 as it pushes card 300 out of card compartment 102, thereby causing card 300 to emerge from card compartment 102 at an angle (e.g., with no surface perpendicular to the first direction in which slider 108 is moving). Accordingly, card 300 may appear to "fan" out of card compartment 102, making it easily visible and easily gripped while still remaining mostly within card compartment 102 (e.g., and therefore held by spring wall 104, as described below). Any taper angle may be selected for slider 108 to function with card compartment 102 (e.g., fit fully within card compartment 102 when in the first position), as long as the angle is tapered enough to push card 300 out in a tilting motion.

Figure 2C:
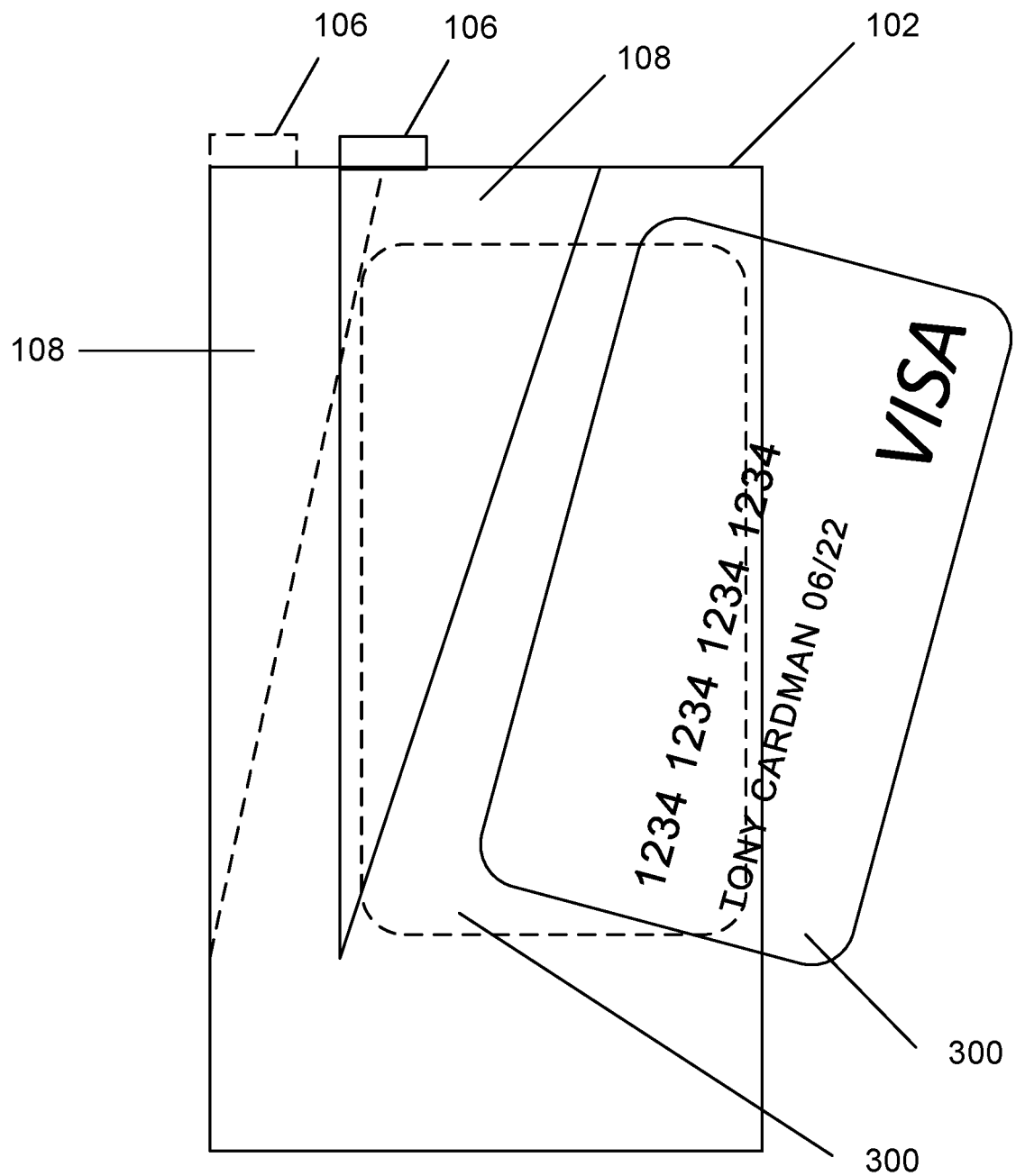
FIG. 2C shows a plurality of sliders according to an embodiment of the present disclosure.
Figure 2D:
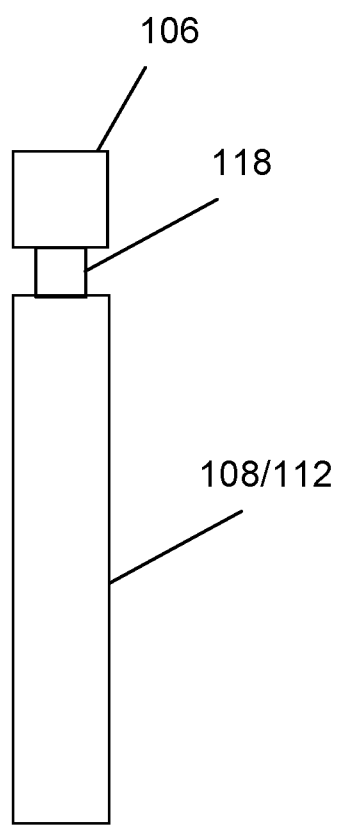
FIGS. 2D-2E show slider components according to an embodiment of the present disclosure.
Figure 2E:
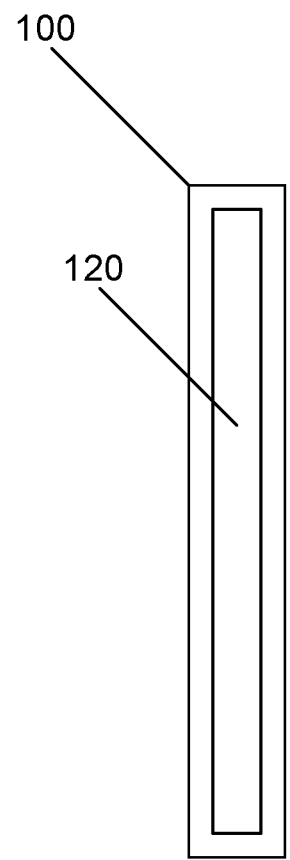
Figure 4:
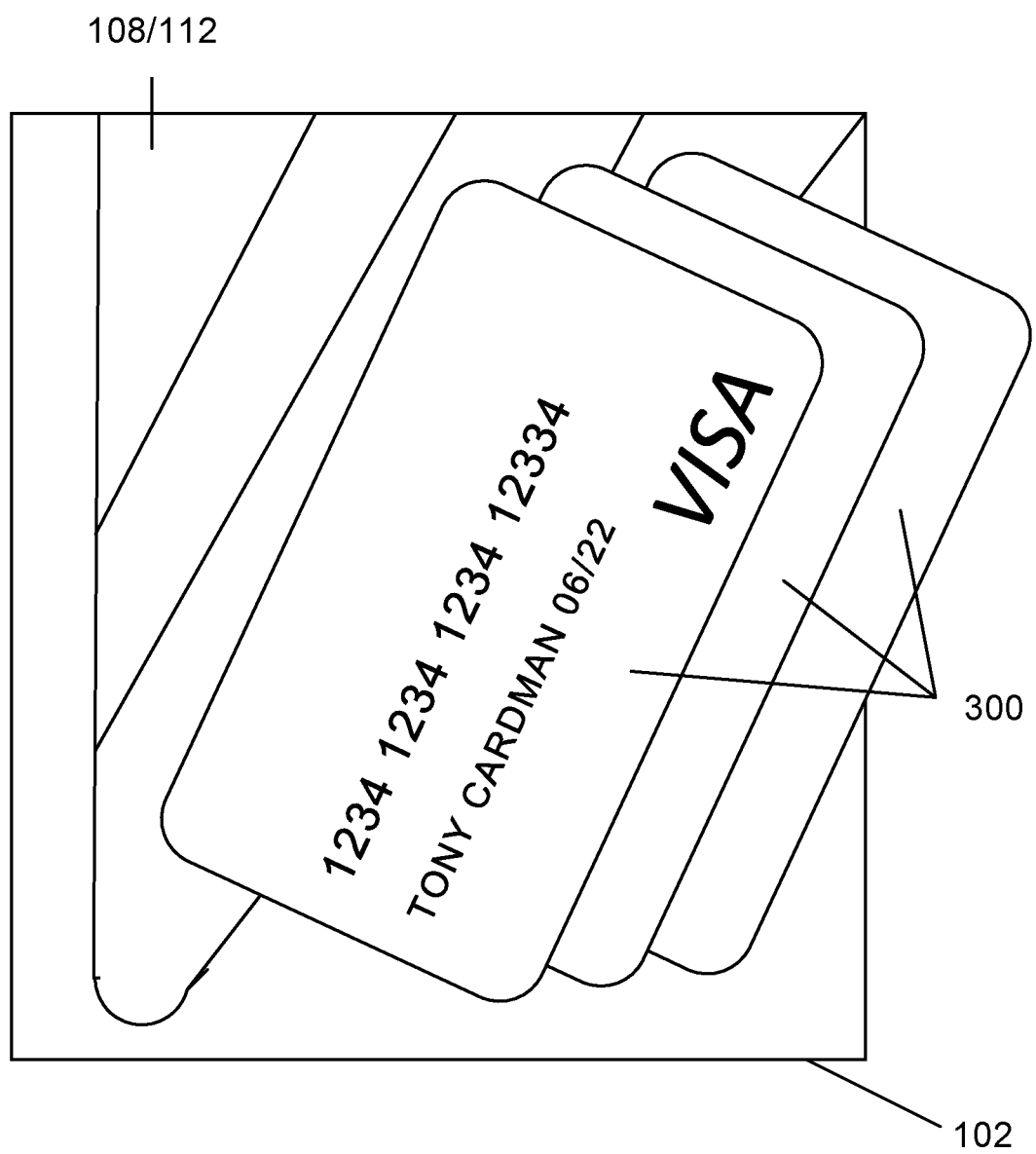
FIG. 4 shows a stepped ejector according to an embodiment of the present disclosure.

FIG. 2C shows a plurality of sliders 108 according to an embodiment of the present disclosure. In some embodiments, plural sliders 108 (e.g., two as shown in FIG. 2C, or more) may be arranged within card compartment 102, and each slider 108 may be coupled to a separate actuator 106. Sliders 108 may be stacked so that individual cards 300 stacked within card compartment 102 may align with individual sliders 108 in a direction of stacking. Sliders 108 may be approximately the same width as cards 300 (e.g., 0.76 mm for credit cards). Accordingly, each slider 108 may push out a separate card 300. As shown in FIG. 2C, this may allow a user to selectively push out at least one card 300 while leaving at least one other card 300 entirely inside card compartment 102. This may also allow the user to push different cards 300 out different distances, for example allowing a bottom card 300 to be pushed out farthest, and a top card 300 to be pushed out somewhat less far, allowing the user to view portions of both cards 300 at the same time. FIG. 4 shows an example of a stepped ejector arrangement that may push staggered cards 300 out of card compartment 102 at different depths, for example.

Figure 3A:
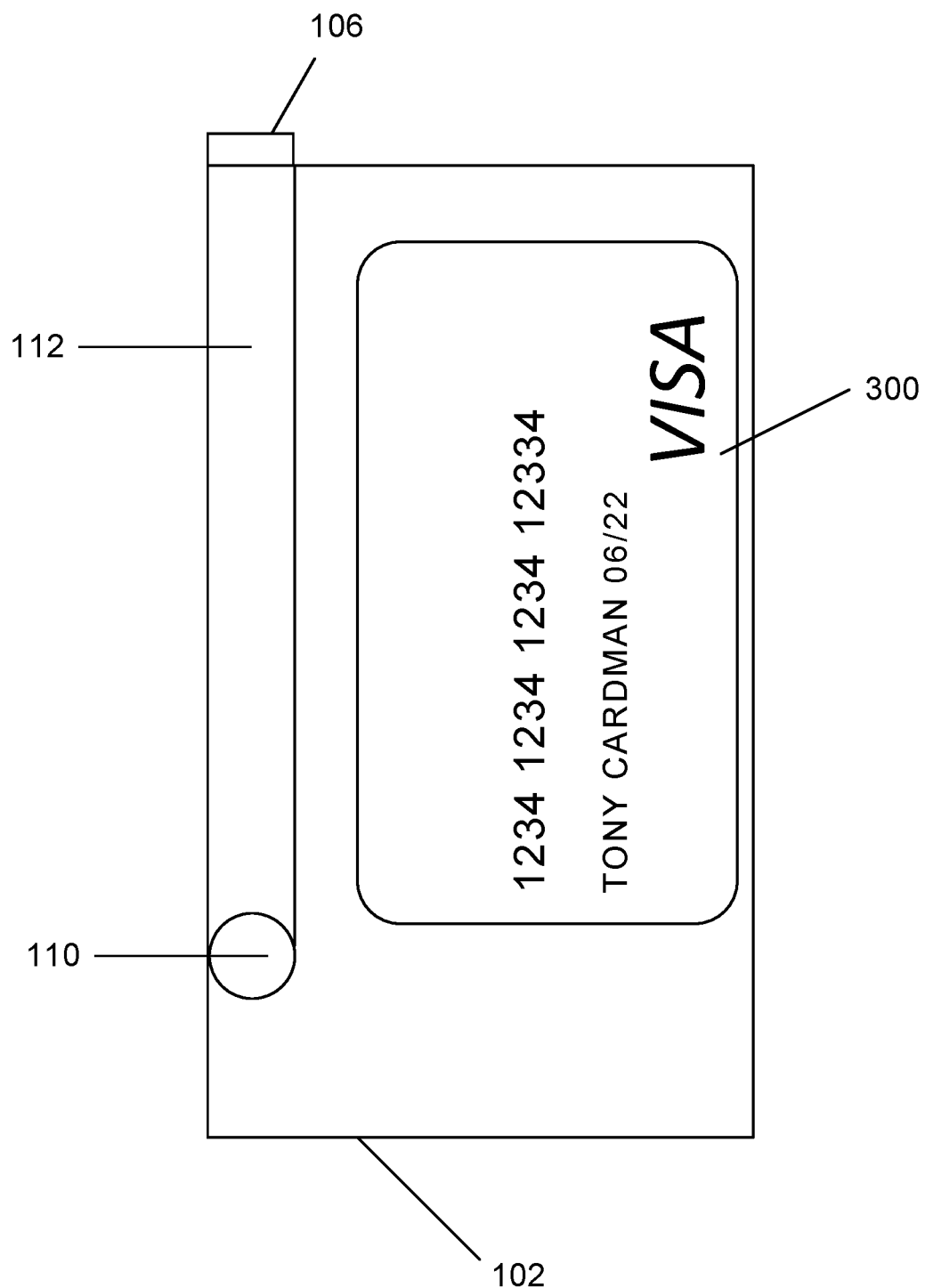
FIGS. 3A-3C show an expander according to an embodiment of the present disclosure.
Figure 3B:
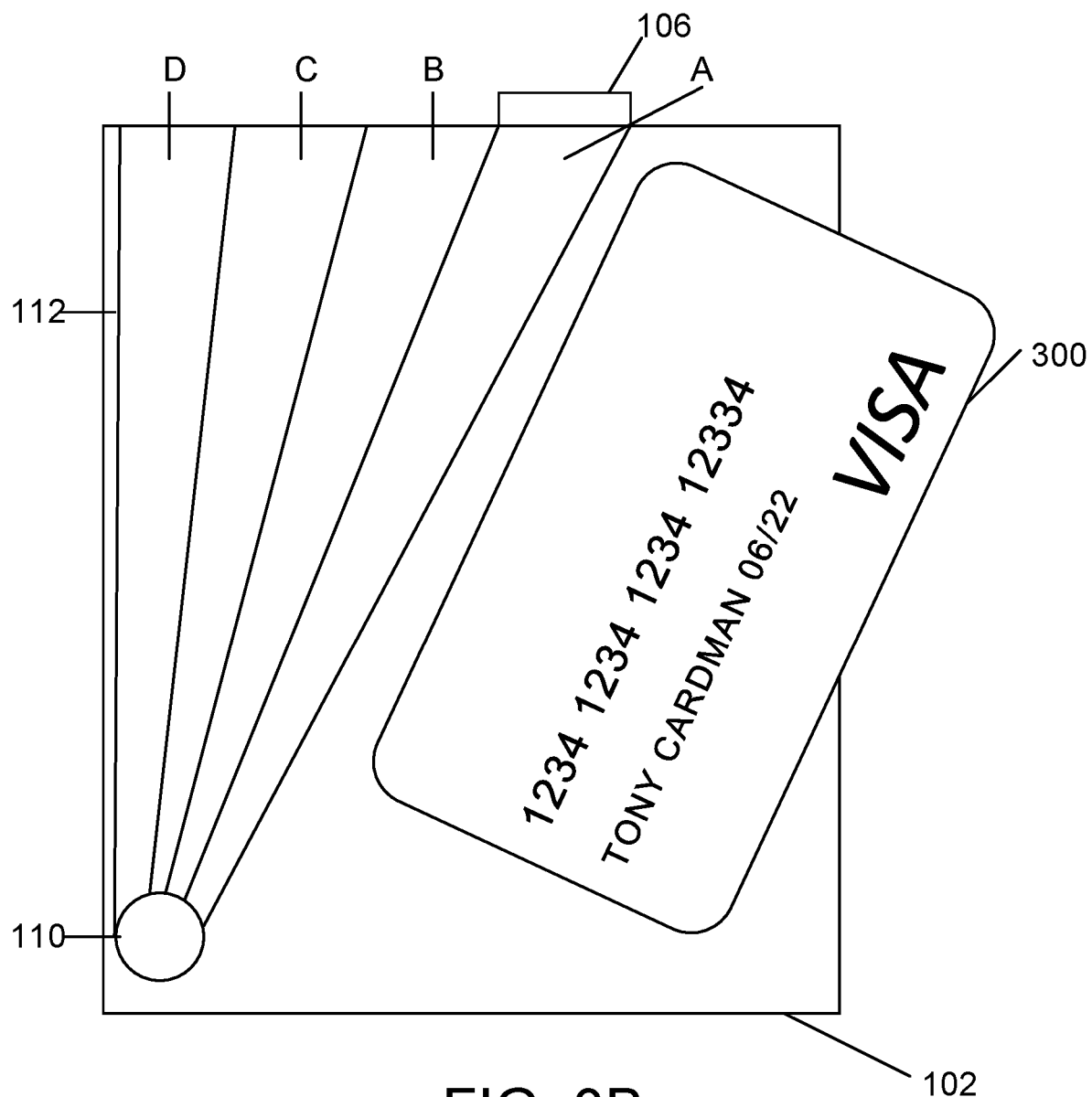
Figure 3C:
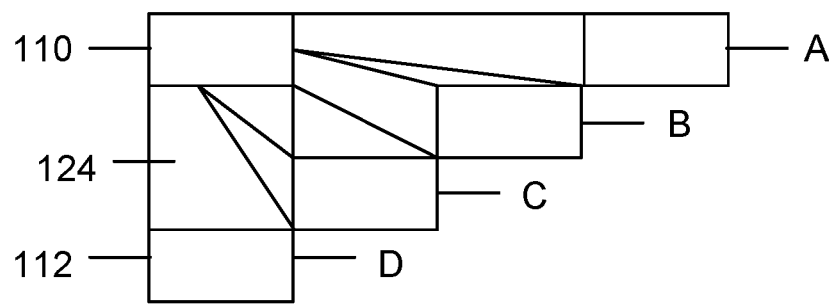

FIGS. 3A-3C show an expander 112 according to an embodiment of the present disclosure. As described above, phone case wallet 100 may include an actuator 106 which may be mechanically coupled to an ejector. In the embodiment of FIGS. 3A-3C, the ejector may include expander 112, and actuator 106 may be an expansion actuator fixedly coupled to expander 112. As shown in FIGS. 3A-3B, as actuator 106 moves in the first direction, expander 112 may expand in the first direction. Accordingly, expander 112 may move from a first position (e.g., FIG. 3A) where card 300 is fully contained within card compartment 102 to a second position (e.g., FIG. 3B) where card 300 is at least partially ejected from card compartment 102.

In some embodiments, similar to slider 108 and actuator 106, actuator 106 and expander 112 may be integrally formed as a single piece. In some embodiments, actuator 106 may be made from or covered by a rubber material or other material that may enhance the ability of a user to grip actuator 106. Expander 112 may be made from the same material or any other material (e.g., wood, metal, plastic, rubber, etc.). In some embodiments, expander 112 and actuator 106 may be joined by a narrow connector 118 that may be narrower than expander 112 and actuator 106, as shown in FIG. 2D. In some embodiments, expander 112 may move within track 120 which may be disposed in the top of phone case wallet 100, as shown in FIG. 2E. Track 120 may be narrower than expander 112 and actuator 106 but sized to accept connector 118, thereby allowing connector 118 to slide in track 120 while the wider expander 112 and actuator 106 are unable to pass through track 120.

As shown in FIGS. 3B-3C, in some embodiments, expander 112 may include a plurality of segments or arms 112A-D coupled to a pivot or axle 110. Each arm 112A-D may be arranged to rotate about axle 110, and in some embodiments the arms 112A-D may be coupled to another (e.g., in an accordion-style arrangement). Actuator 106 may be coupled to a lead arm 112A, and due to the arrangement of arms 112A-D (wherein arms 112A-D rotate about axle 110 and are coupled to one another), moving actuator 106 may move lead arm 112A, which may in turn move other arms 112B-D attached thereto. In some embodiments, arms 112A-D may be coupled to one another by being encapsulated within a single piece of fabric 124. Fabric 124 may be elastic and tightly fitting on arms 112A-D, so that as lead arm 112A moves, it may drag other arms 112B-D along with fabric 124. Due to the positioning of axle 110 in card compartment 102 on a side of phone case wallet 100 opposite the side on which actuator 106 is disposed, arms 112A-D may rotate card 300 as expander 112 pushes card 300 out of card compartment 102. This may cause card 300 to emerge from card compartment 102 at an angle (e.g., with no surface perpendicular to the first direction in which slider 108 is moving). Accordingly, card 300 may appear to "fan" out of card compartment 102, making it easily visible and easily gripped while still remaining mostly within card compartment 102 (e.g., and therefore held by spring wall 104, as described below).

As shown in FIG. 3C, arms 112A-D may be stacked so that individual cards 300 stacked within card compartment 102 may align with individual arms 112A-D in a direction of stacking. Arms 112A-D may be approximately the same width as cards 300 (e.g., 0.76 mm for credit cards). Accordingly, each arm 112A-D may push out a separate card 300. Accordingly, expander 112 may push cards out in a staggered fashion, with different cards 300 extending out of card compartment 102 at different distances, for example allowing a bottom card 300 to be pushed out farthest, and a top card 300 to be pushed out somewhat less far, allowing the user to view portions of both cards 300 at the same time. FIG. 4 shows an example of a stepped ejector arrangement that may push staggered cards 300 out of card compartment 102 at different depths, for example.

Figure 5A:
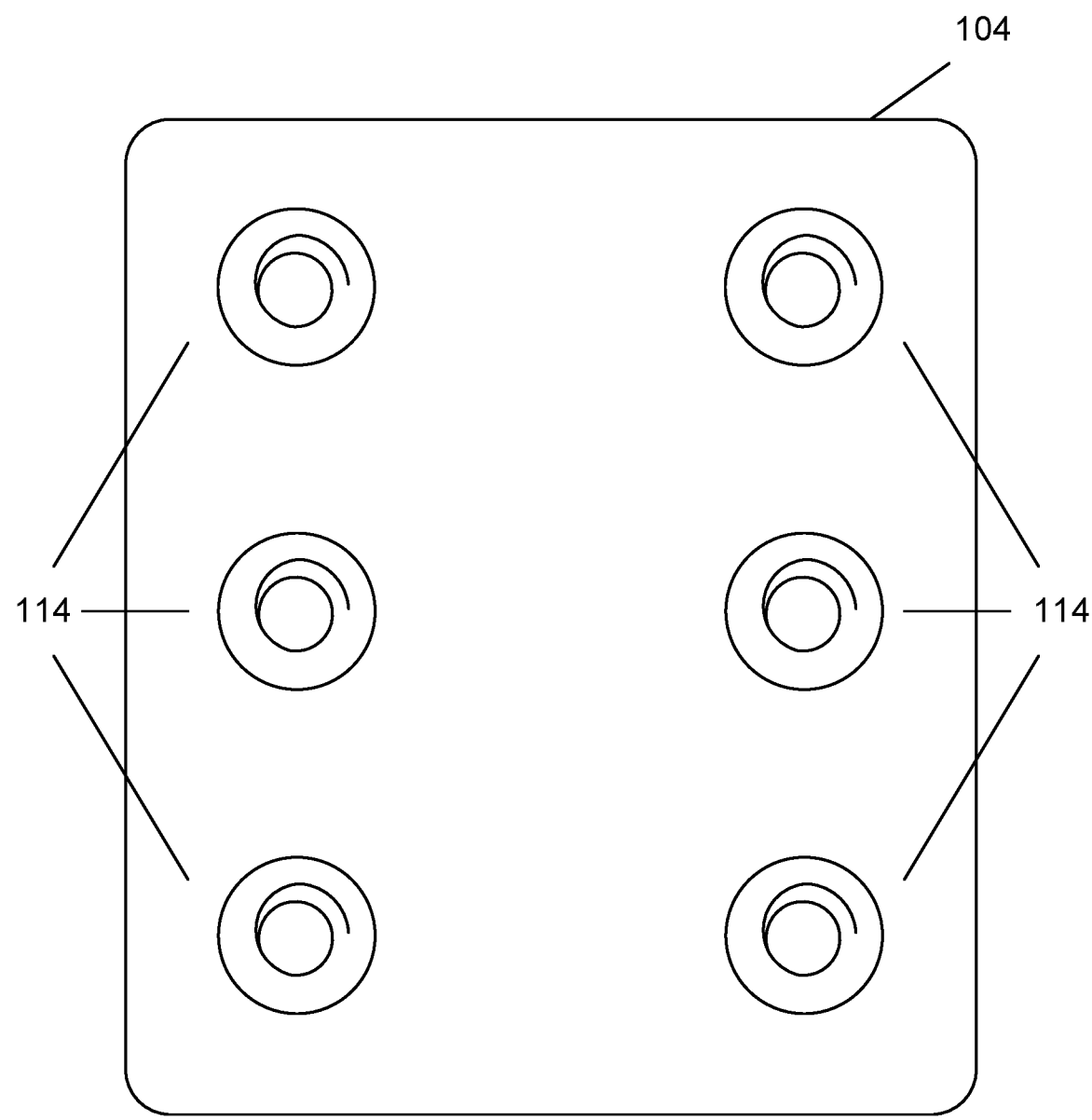
FIGS. 5A-5C show a spring wall according to an embodiment of the present disclosure.
Figure 5B:
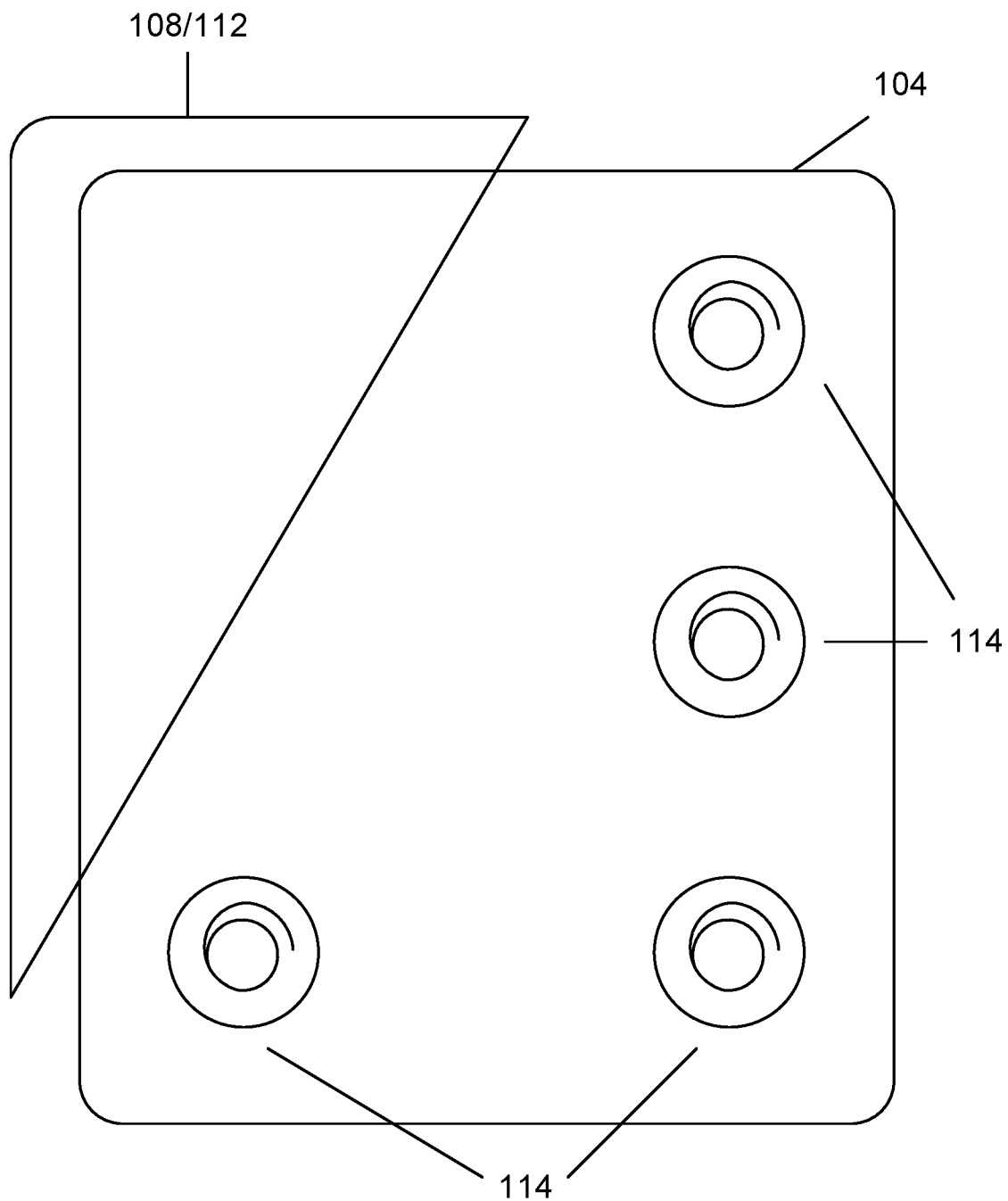
Figure 5C:
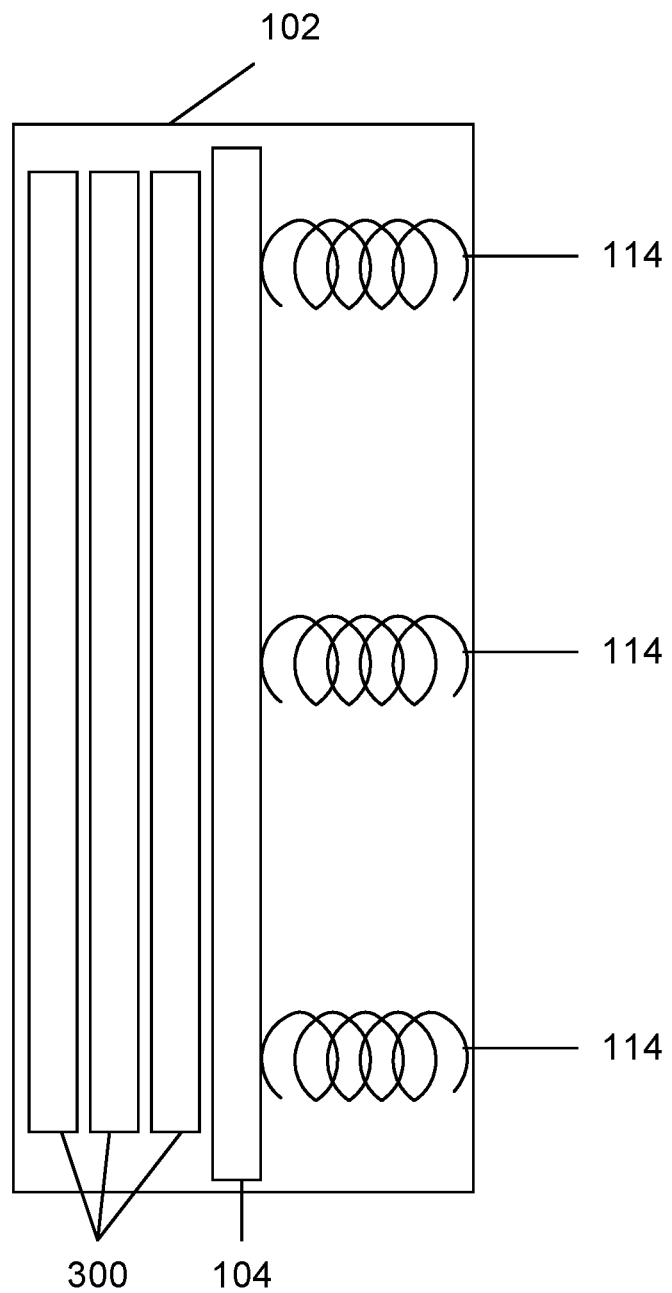

FIGS. 5A-5C show a spring wall 104 according to an embodiment of the present disclosure. As shown above in FIG. 1C and FIG. 5C, spring wall 104 may be disposed within card compartment 102 and may apply pressure to card(s) 300 in a direction perpendicular to the direction in which the ejector (e.g., slider 108 and/or expander 112) pushes card(s) 300 out of card compartment 102. FIGS. 5A-5C illustrate spring wall 104 in detail.

Spring wall 104 may be coupled to at least one spring 114. The at least one spring 114, in turn, may be coupled to phone case wallet 100 (e.g., to an inner surface of card compartment 102) as shown in FIG. 5C. In FIG. 5C, it may be seen that springs 114 may cause spring wall 104 to apply pressure to cards 300, thereby holding cards 300 within card compartment 102. In some embodiments, spring wall 104 may continue to apply pressure to card(s) 300 even as the ejector (e.g., slider 108 and/or expander 112) pushes card(s) 300 out of card compartment 102. In some embodiments, spring wall 104 may be made of a conductive material such as a metal in order to shield cards 300 from being scanned or otherwise tampered with by external radiation/energy sources.

FIG. 5A shows an example wherein spring wall 104 is coupled to six springs 114, and FIG. 5B shows an example wherein spring wall 104 is coupled to four springs 114, but any number of springs 114 may be used. Furthermore, while coil springs 114 are illustrated, other types of springs 114 may be used in other embodiments. In the example of FIG. 5A, springs 114 are evenly distributed about the surface of spring wall 104. This arrangement may provide even pressure to card(s) 300. In the example of FIG. 5B, springs 114 are arranged so that springs 114 are not disposed near the ejector (e.g., slider 108 and/or expander 112) when the ejector is in a fully retracted position. This may reduce initial friction when a user starts to manipulate actuator 106, for example.

As described above, the disclosed embodiments may provide phone case wallets 100 that may hold cards 300 securely (e.g., due to spring wall 104 applying pressure to the cards). The disclosed embodiments may also provide phone case wallets 100 that may eject cards 300 in a "fan out" formation, allowing users to easily view and/or grab individual cards 300 separately, even when multiple cards 300 are housed within card compartment 102.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A case comprising:
 a first compartment configured to contain a smartphone;
 a second compartment configured to contain at least one card, the second compartment being open on a first side; and
 an ejector disposed at least partially in the second compartment and configured to eject the at least one card through the first side, the ejector comprising:
  an expander configured to expand in a first direction from a second side of the second compartment opposite the first side of the second compartment towards the first side of the second compartment; and
  an expansion actuator disposed on an outside of the case and configured to expand the expander, the expansion actuator being disposed adjacent to a third side of the second compartment that is substantially perpendicular to the first side of the second compartment,
 the expander including:
  an axle disposed adjacent to a fourth side of the second compartment that is substantially perpendicular to the first side of the second compartment and at an opposite end of the second compartment from the third side;
  a plurality of arms, each arm including:
   a first side rotatably coupled to the axle adjacent to the fourth side of the second compartment, and
   a second side opposite the first side, disposed adjacent to the third side of the second compartment, and configured to be moved in the first direction by the expansion actuator,
   wherein each respective one of the plurality of arms is rotatably coupled to the axle independently of the remaining plurality of arms; and
  an elastic member disposed adjacent to the fourth side of the second compartment and coupling each of the plurality of arms to one another at the respective second sides of the respective plurality of arms.

2. The case of claim 1, wherein the plurality of arms are in a second direction substantially perpendicular to the first direction.

3. The case of claim 2, wherein the expansion actuator comprises a gear set at the axle configured to move each of the plurality of arms towards the first side of the second compartment at different rates.

4. The case of claim 1, further comprising a spring wall configured to compress the at least one card within the second compartment in a second direction substantially perpendicular to the first direction.

5. The case of claim 4, further comprising at least one spring coupling the spring wall to the case.

6. The case of claim 4, further comprising a plurality of springs coupling the spring wall to the case, wherein:
 the expansion actuator comprises a gear set at the axle configured to move each of the plurality of arms towards the first side of the second compartment at different rates; and
 the plurality of springs is arranged with a greater number of springs adjacent to the fourth side of the second compartment than a number of springs adjacent to the third side of the second compartment.

7. The case of claim 1, wherein the elastic member comprises a piece of fabric.

* * * * *